United States Patent
Guo et al.

(10) Patent No.: US 11,967,865 B2
(45) Date of Patent: Apr. 23, 2024

(54) DRIVE MOTOR

(71) Applicants: Zhejiang Baolong M&E Co., Ltd., Yueqing (CN); Shenzhen Yunding Information Technology Co., Ltd., Shenzhen (CN)

(72) Inventors: Zhiyan Guo, Honghu (CN); Jun Li, Lanxi (CN); Fangkui LIn, Yueqing (CN)

(73) Assignees: ZHEJIANG BAOLONG M&E CO., LTD., Yueqing (CN); SHENZHEN YUNDING INFORMATION TECHNOLOGY CO., LTD., Shenzhen (CN)

( * ) Notice: Subject to any disclaimer, the term of this patent is extended or adjusted under 35 U.S.C. 154(b) by 548 days.

(21) Appl. No.: 17/251,217

(22) PCT Filed: Jan. 16, 2019

(86) PCT No.: PCT/CN2019/071897
§ 371 (c)(1),
(2) Date: Dec. 11, 2020

(87) PCT Pub. No.: WO2019/237736
PCT Pub. Date: Dec. 19, 2019

(65) Prior Publication Data
US 2021/0249918 A1    Aug. 12, 2021

(30) Foreign Application Priority Data

Jun. 11, 2018  (CN) .......................... 201820899338.9
Aug. 8, 2018  (CN) .......................... 201810896858.9

(51) Int. Cl.
*H02K 1/27* (2022.01)
*H02K 1/276* (2022.01)
*H02K 21/14* (2006.01)

(52) U.S. Cl.
CPC ........... *H02K 1/2766* (2013.01); *H02K 21/14* (2013.01)

(58) Field of Classification Search
CPC ....... H02K 21/14; H02K 1/276; H02K 1/2766
(Continued)

(56) References Cited

U.S. PATENT DOCUMENTS 6,147,428 A * 11/2000 Takezawa ................ H02K 7/14
                                                310/156.57
6,218,753 B1 * 4/2001 Asano .................... H02K 1/276
                                                310/156.53
(Continued)

FOREIGN PATENT DOCUMENTS

CN    101669266 A    3/2010
CN    105305679 A    2/2016
(Continued)

OTHER PUBLICATIONS

Translation of foreign document CN 105305679 A (Year: 2016).*

*Primary Examiner* — Alex W Mok
(74) *Attorney, Agent, or Firm* — Bayramoglu Law Offices LLC

(57) ABSTRACT

A drive motor includes a housing and a stator iron core arranged inside the housing. A rotor iron core is placed through the inside of the stator iron core. The rotor iron core includes a cylindrical iron core body, and two openings are symmetrically formed on a periphery of the iron core body in a radial direction of the iron core body. The iron core body is provided with a plurality of mounting slots for receiving magnets, and each of both sides of the mounting slot is provided with a magnetic-leakproof air slot. The central part of the iron core body is provided with a through hole into which a rotating shaft is inserted. Moreover, the magnets are mounted in the mounting slots by means of insertion.

8 Claims, 4 Drawing Sheets

(58) Field of Classification Search
USPC .................................................. 310/156.56
See application file for complete search history.

(56) References Cited

U.S. PATENT DOCUMENTS

| | | | | |
|---|---|---|---|---|
| 6,897,590 B2* | 5/2005 | Popov | .................. | H02K 1/2773 |
| | | | | 310/156.56 |
| 7,415,756 B2* | 8/2008 | Ishida | ..................... | F04B 39/14 |
| | | | | 29/598 |
| 9,793,783 B2* | 10/2017 | Hattori | ................. | H02K 1/2766 |
| 9,812,913 B2* | 11/2017 | Saito | ....................... | H02K 1/276 |
| 2015/0303749 A1* | 10/2015 | Okubo | ................... | H02K 21/14 |
| | | | | 310/156.38 |
| 2016/0197541 A1* | 7/2016 | Okubo | ................. | H02K 1/2706 |
| | | | | 310/156.08 |
| 2016/0285326 A1* | 9/2016 | Kawamura | ............ | H02K 15/03 |
| 2017/0047799 A1* | 2/2017 | Huang | ................... | H02K 29/03 |

FOREIGN PATENT DOCUMENTS

| | | | | | |
|---|---|---|---|---|---|
| CN | 105576867 A | | 5/2016 | | |
| CN | 106230215 A | | 12/2016 | | |
| CN | 206894379 U | * | 1/2018 | ............. | H02K 1/276 |
| CN | 108808918 A | | 11/2018 | | |
| JP | H07236295 A | | 9/1995 | | |
| JP | H10174323 A | | 6/1998 | | |
| JP | H11332144 A | | 11/1999 | | |
| KR | 20130011664 A | * | 1/2013 | | |

* cited by examiner

DRIVE MOTOR

CROSS REFERENCE TO THE RELATED APPLICATIONS

This application is the national phase entry of International Application No. PCT/CN2019/071897, filed on Jan. 16, 2019, which is based upon and claims priority to Chinese Patent Application No. 201820899338.9, filed on Jun. 11, 2018; and Chinese Patent Application No. 201810896858.9, filed on Aug. 8, 2018, the entire contents of which are incorporated herein by reference.

TECHNICAL FIELD

The present invention relates to the technical field of motors, in particular to a drive motor.

BACKGROUND

A motor is an electromagnetic device designed to convert or transmit electric energy according to the law of electromagnetic induction, as well as a drive mechanism. Motors are widely used in vehicles and household appliances such as electric toothbrushes, hair dryers and the like.

The motor iron core includes a stator iron core and a rotor iron core. The motor iron core plays a pivotal role in the entire motor and functions to increase the magnetic flux of the inductive coil to achieve the maximum conversion of electromagnetic power. Prior rotor iron core structures, however, have the following shortcomings.

(1) A traditional motor iron core has a complicated and bulky structure, which increases the size of the entire motor and increases the space occupied by the motor.
(2) The method of assembling the iron core and magnets is laborious and inconvenient, which greatly impedes the installation and use of the magnet.

In view of the above-mentioned problems, it is highly desirable to improve the existing motor structure, simplify the iron core structure, and reduce the size of the iron core, thereby reducing the space occupied by the motor while facilitating the installation and use of the magnet.

SUMMARY

Technical Problem

The present invention aims to solve the technical problem that the existing motor iron core has a complicated structure and a large size, which increases the space occupied by the motor and is not conducive to the installation of the magnet.

Technical Solution

To solve the above-mentioned technical problems, the present invention provides the following technical solutions. A drive motor includes a housing and a stator iron core arranged inside the housing. A rotor iron core is placed through the inside of the stator iron core. The rotor iron core includes a cylindrical iron core body, and two openings are symmetrically formed on a periphery of the iron core body in a radial direction of the iron core body. The iron core body is provided with a plurality of mounting slots for receiving magnets, and each of both sides of the mounting slot is provided with a magnetic-leakproof air slot. The central part of the iron core body is provided with a through hole into which a rotating shaft is inserted.

In the above solution, the mounting slots include two groups of mounting slots, and the two groups of mounting slots are provided on the upper side and the lower side of the two openings, respectively. Each group of mounting slots include two mounting slots, and the two mounting slots in the same group are symmetrically arranged with respect to the radial direction of the iron core body.

In the above solution, the symmetry line of the two mounting slots in the same group coincides with the symmetry line of the two openings.

In the above solution, a partition is provided between the two mounting slots in the same group.

In the above solution, the mounting slot is rectangular.

In the above solution, the opening has a trapezoidal shape gradually narrowing toward the through hole.

In the above solution, each of the mounting slots is arranged adjacent to the edge of the rotor iron core.

In the above solution, the mounting slots are arranged along the circumferential direction of the rotor iron core.

Advantages

Compared with the prior art, the present invention simplifies the structure of the iron core body and reduces its size, thereby reducing the space occupied by the motor. The iron core body adopts an embedded type, having a simple and compact structure. Thus, it is easy to mount the iron core on a motor. Moreover, the magnets are mounted in the mounting slots by means of insertion, which is quick and convenient to operate. Each of both sides of the mounting slot is provided with a magnetic-leakproof air slot to prevent the leakage of the electromagnetic force of the magnet, so that the electromagnetic force of the magnet can be effectively utilized to improve the performance of the motor.

DETAILED DESCRIPTION OF THE EMBODIMENTS

Optimal Embodiment

Figure 1:
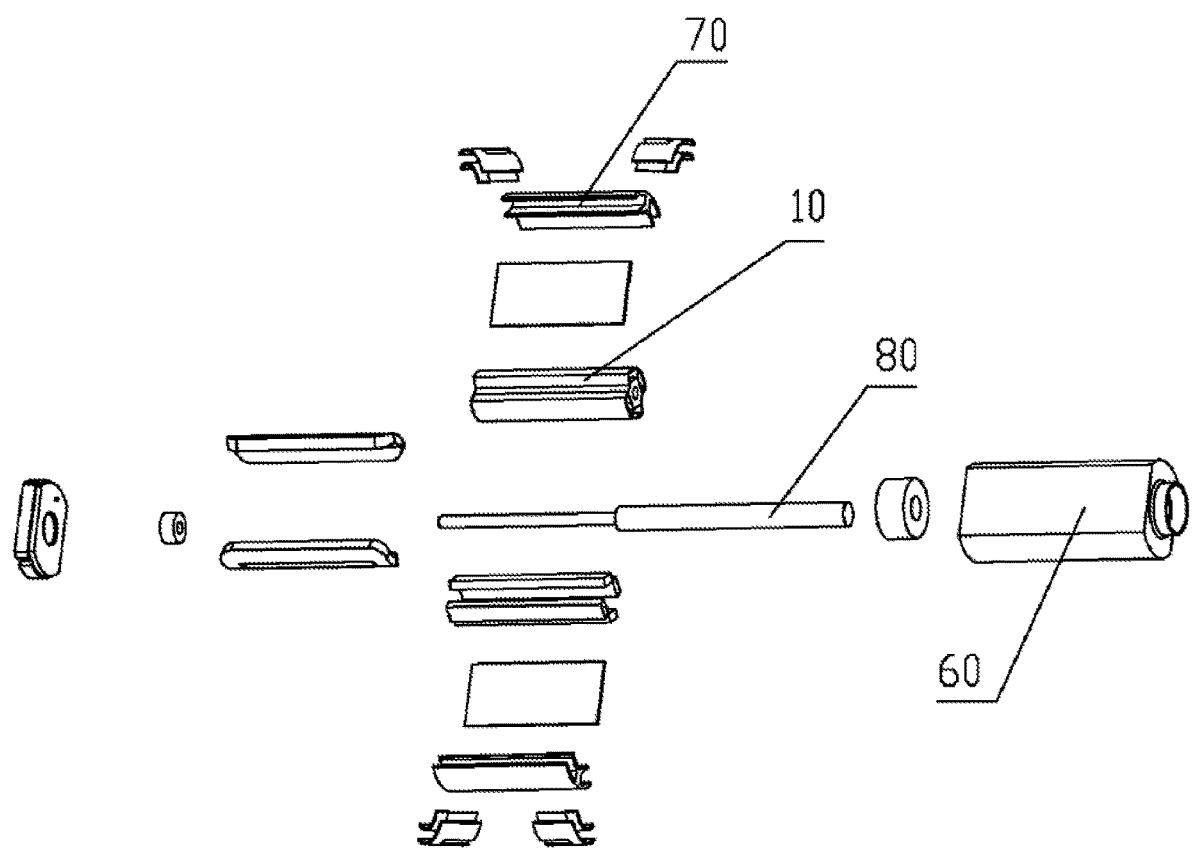
FIG. 1 is an exploded view of the present invention.
Figure 2:
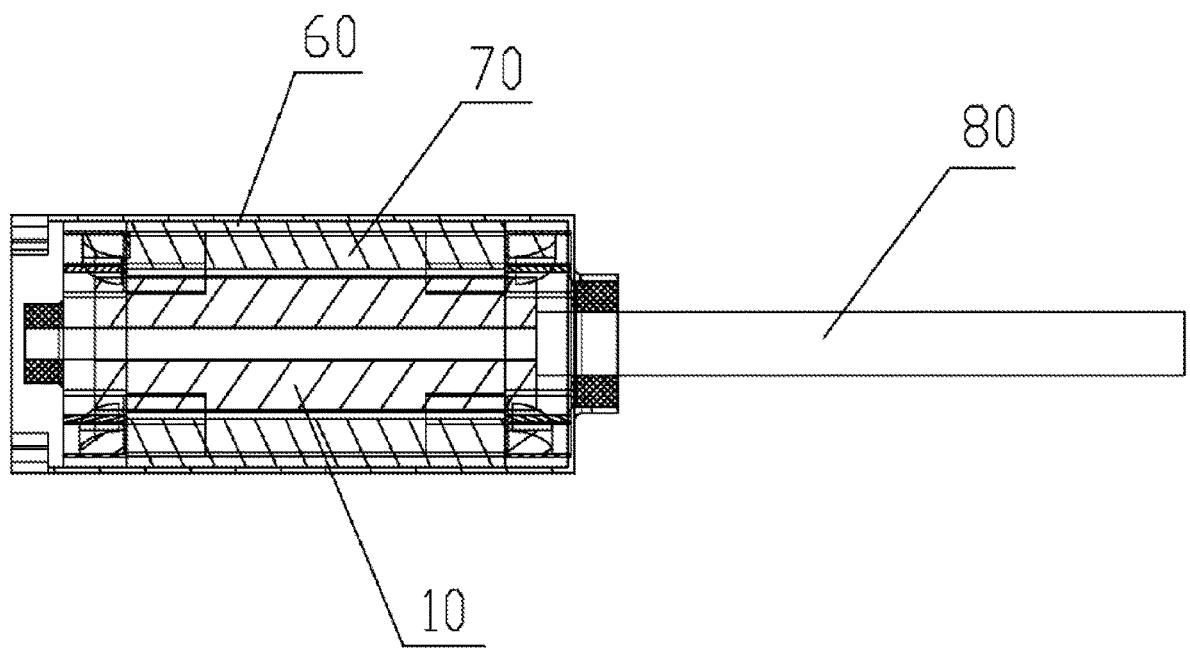
FIG. 2 is a cross-sectional view of the present invention.

The present invention provides a drive motor, the structure of the iron core body is simplified and its size is reduced, thereby reducing the space occupied by the motor. The iron core body has a simple and compact structure and is easily mounted on the motor. Moreover, the magnets are mounted in the mounting slots by means of insertion, which is quick and convenient to operate. The present invention will be described in detail below with reference to the drawings and specific implementations of the specification.

As shown in FIGS. 1-4, a drive motor includes the housing 60 and the stator iron core 70 arranged inside the housing 60. A rotor iron core is placed through the inside of the stator iron core 70. The rotor iron core includes the cylindrical iron core body 10, and two openings 20 are symmetrically formed on a periphery of the iron core body 10 in a radial direction of the iron core body 10. The opening 20 has a trapezoidal shape gradually narrowing toward the through hole 50, so that it is convenient to manually or automatically take the iron core and mount the iron core into the motor.

Figure 3:
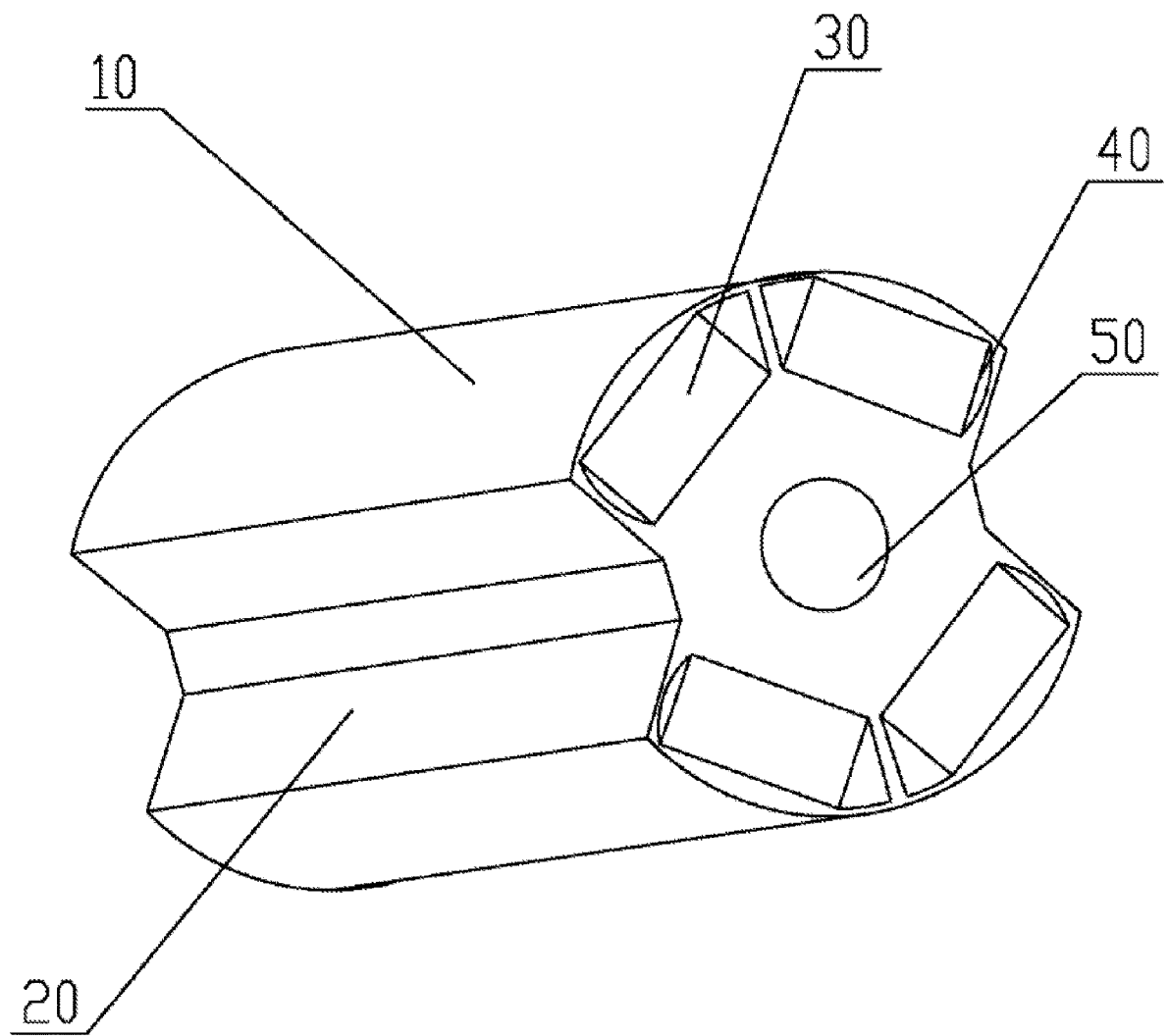
FIG. 3 is a structural schematic view of the rotor iron core of the present invention.
Figure 4:
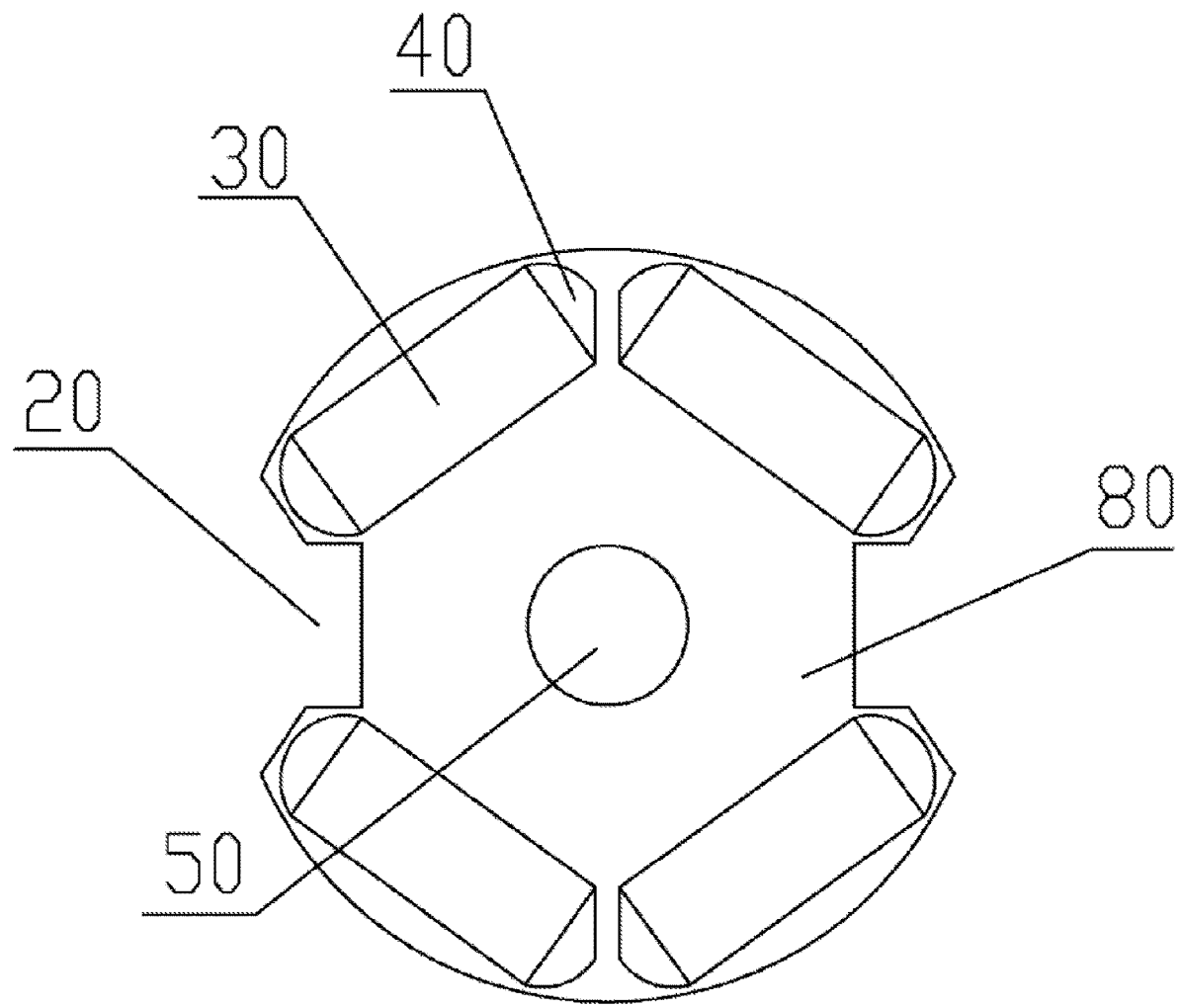
FIG. 4 is a side view of the rotor iron core of the present invention.

As shown in FIGS. 3-4, the iron core body 10 is provided with a plurality of mounting slots 30. The mounting slots 30 are rectangular and configured to receive rectangular magnets. Correspondingly, the magnet should have the same shape as the mounting slot, and the rectangular magnets are readily produced, thereby improving the production speed. Preferably, the mounting slots 30 include two groups of mounting slots, and the two groups of mounting slots 30 are provided on the upper side and the lower side of the two openings 20, respectively. Each group of mounting slots 30 include two mounting slots, and the two mounting slots 30 in the same group are symmetrically arranged with respect to the radial direction of the iron core body 10, which are reasonably distributed to reduce the space occupied.

Preferably, the symmetry line of the two mounting slots 30 in the same group coincides with the symmetry line of the two openings 20. This reasonable structure design further reduces the size of the iron core.

Further, since the magnetic field strength of the magnet gradually decreases toward the direction away from the magnet, each mounting slot 30 is arranged adjacent to the edge of the rotor iron core, so that the stator iron core 70 is adjacent to the magnet. In this way, the electromagnetic force of the magnet can be effectively utilized to improve the performance of the motor.

Preferably, the mounting slots are arranged along the circumferential direction of the rotor iron core, which conforms to the characteristics of the magnetic field distribution, and increases the area of the stator iron core 70 cutting the magnetic field lines, thereby improving the performance of the iron core. Moreover, the size of the iron core is effectively reduced compared to the horizontal arrangement.

A partition is arranged between the two mounting slots 30 in the same group, and the partition is supported on a top leg of the magnet, so that the magnet is fixed more firmly and is prevented from shaking.

In the present invention, each of both sides of the mounting slot 30 is provided with the magnetic-leakproof air slot 40 to facilitate the insertion of the magnet into the mounting slot 30, and prevent the electromagnetic force of the magnet from leaking, so that the electromagnetic force of the magnet can be can effectively utilized to improve the performance of the motor.

The central part of the iron core body 10 is provided with the through hole 50 into which the rotating shaft 80 of the motor is inserted, and then the rotating shaft 80 is driven to rotate by the rotation of the iron core body 10.

The stator iron core 70 is arranged in multiple manners. For example, the stator iron core 70 includes a first iron core connected to the housing 60 and a second iron core arranged inside the first iron core. The first iron core and the second iron core are connected by a core column, and a slot for winding a coil is enclosed by the first iron core, the second iron core and both sides of the core column.

Alternatively, both sides of the two first iron cores are connected by an iron core baffle. Both ends of the iron core baffle and the two first iron cores are detachably arranged. The two sides of the first iron core are provided with limiting slots, and limiting plates protrude from two sides of the iron core baffle. In this arrangement, the iron core can realize fly-fork winding, and the iron core is welded to the iron core baffle after a coil is wound, which increases the efficiency of assembling the drive motor. Additionally, the coil can be filled in the slot to increase the fill factor of the slot, thereby improving the performance of the motor.

The iron core body 10 of the present invention is placed in the space enclosed by two second iron cores, which reduces the size of the drive motor and makes the motor more compact and lightweight.

The present invention simplifies the structure of the iron core body and reduces its size, thereby reducing the space occupied by the motor. The iron core body adopts an embedded type, having a simple and compact structure, and is easily mounted on a motor. Moreover, the magnets are mounted in the mounting slots by means of insertion, which is quick and convenient to operate. Each of both sides of the mounting slot is provided with a magnetic-leakproof air slot to prevent the leakage of the electromagnetic force of the magnet, so that the electromagnetic force of the magnet can be effectively utilized to improve the performance of the motor.

The present invention is not limited to the above-mentioned optimal implementation. Anyone should know that structural changes made based on the enlightenment of the present invention, and all technical solutions that are the same or similar to the present invention shall fall within the scope of protection of the present invention.

What is claimed is:
1. A drive motor, comprising
a housing, and
a stator iron core;
wherein
the stator iron core is arranged inside the housing;
a rotor iron core is placed through an inside of the stator iron core;
the rotor iron core comprises a cylindrical iron core body; and a first opening and second opening symmetrically formed on a periphery of the cylindrical iron core body in a radial direction of the cylindrical iron core body, respectively;
the cylindrical iron core body is provided with a plurality of mounting slots for receiving magnets, the plurality of mounting slots comprise two groups of mounting slots, such that a first group of mounting slots is provided on an upper side of the two openings while a second group of mounting slots is provided on a lower side of the two openings; each group of the two groups of mounting slots comprise two mounting slots, such that there are two mounting slots between each pair of adjacent openings; the mounting slots are arranged symmetrically in pairs and non-uniformly along a circumferential direction of the rotor iron core; and each of both sides of each mounting slot of the plurality of mounting slots is provided with a magnetic-leakproof air slot, wherein a shape of the magnetic-leakproof air slots at the closest ends of the two mounting slots in a same group are a combination of an arc and a straight line, such that two mounting slots in the same group are closer to each other;
each of the first opening and second opening has a trapezoidal shape gradually narrowing toward the through hole; and
a central part of the cylindrical iron core body is provided with a through hole, a rotating shaft is inserted into the through hole.
2. The drive motor according to claim 1, wherein, the two mounting slots in the each group are symmetrically arranged with respect to the radial direction of the cylindrical iron core body.

3. The drive motor according to claim 2, wherein,
a symmetry line of the two mounting slots in the each group coincides with a symmetry line of the two openings.

4. The drive motor according to claim 2, wherein,
a partition is provided between the two mounting slots in the each group.

5. The drive motor according to claim 2, wherein,
the each mounting slot is rectangular.

6. The drive motor according to claim 1, wherein,
the each mounting slot is arranged adjacent to an edge of the rotor iron core.

7. The drive motor according to claim 1, wherein,
the plurality of mounting slots are arranged along the circumferential direction of the rotor iron core.

8. The drive motor according to claim 1, wherein,
an angle between two adjacent mounting slots on a side facing the through hole is greater than 90 degrees and less than 180 degrees when the two adjacent mounting slots are without an opening therebetween; and an angle between two adjacent mounting slots on a side facing the through hole is less than 90 degrees and greater than 0 degrees when the two adjacent mounting slots are with one of the first opening or second opening therebetween.

* * * * *